(12) United States Patent
Ivantysynova et al.

(10) Patent No.: US 9,115,748 B2
(45) Date of Patent: Aug. 25, 2015

(54) AXIAL SLIDING BEARING AND METHOD OF REDUCING POWER LOSSES THEREOF

(75) Inventors: Monika Marianne Ivantysynova, Lafayette, IN (US); Jonathan Baker, Novelty, OH (US)

(73) Assignee: Purdue Research Foundation, West Lafayette, IN (US)

( * ) Notice: Subject to any disclaimer, the term of this patent is extended or adjusted under 35 U.S.C. 154(b) by 1076 days.

(21) Appl. No.: 12/933,919

(22) PCT Filed: Apr. 1, 2009

(86) PCT No.: PCT/US2009/039088
§ 371 (c)(1),
(2), (4) Date: Nov. 16, 2010

(87) PCT Pub. No.: WO2009/146060
PCT Pub. Date: Dec. 3, 2009

(65) Prior Publication Data
US 2011/0056369 A1    Mar. 10, 2011

Related U.S. Application Data

(60) Provisional application No. 61/041,257, filed on Apr. 1, 2008.

(51) Int. Cl.
*F16C 17/04*    (2006.01)
*F04B 1/20*    (2006.01)
(Continued)

(52) U.S. Cl.
CPC ............... *F16C 17/04* (2013.01); *F04B 1/2007* (2013.01); *F04B 1/2028* (2013.01);
(Continued)

(58) Field of Classification Search
CPC ........ F04D 5/001; F01B 3/005; F01B 3/0047; F16C 17/045; F16C 17/047; F16J 15/3424; F16J 15/3428; F16H 39/08; F04B 1/2042; F04B 1/2028; F04B 27/0817; F04B 27/083; F04B 27/0834
USPC ............................ 92/71, 57, 12.2, 13; 91/487
See application file for complete search history.

(56) References Cited

U.S. PATENT DOCUMENTS 1,867,308 A * 7/1932 Durner ............................ 91/487
1,924,629 A * 8/1933 Thoma ............................ 91/487
(Continued)

FOREIGN PATENT DOCUMENTS

GB    2274491    * 7/1994
JP    2003-161268    6/2003
(Continued)

*Primary Examiner* — Edward Look
*Assistant Examiner* — Michael Quandt
(74) *Attorney, Agent, or Firm* — Hartman Global IP Law; Gary M. Hartman; Michael D. Winter

(57) ABSTRACT

A machine and method for a hydrostatic axial sliding bearing that has bearing and sealing functions and is capable of exhibiting reduced power losses. The hydrostatic axial sliding bearing of the machine is defined by axial sliding bearing surfaces that are separated by a fluid film and adapted for movement relative to each other during operation of the machine. The machine has first and second elements that define a first and a second of the axial sliding bearing surfaces. In combination, the first and second axial sliding bearing surfaces function as bearing and sealing surfaces for the hydrostatic axial sliding bearing. The machine is adapted so that the first and second axial sliding bearing surfaces move relative to each other in a first direction of motion, and at least the second axial sliding bearing surface has a surface profile with an oscillatory waveform in the first direction of motion.

23 Claims, 10 Drawing Sheets

(51) Int. Cl.
   *F04B 27/08* (2006.01)
   *F16C 32/06* (2006.01)
   *F16C 33/04* (2006.01)

(52) U.S. Cl.
   CPC ............ *F04B 1/2035* (2013.01); *F04B 27/083* (2013.01); *F04B 27/0817* (2013.01); *F04B 27/0834* (2013.01); *F16C 32/06* (2013.01); *F16C 33/04* (2013.01)

(56) References Cited

U.S. PATENT DOCUMENTS

| | | | | |
|---|---|---|---|---|
| 2,155,455 A | * | 4/1939 | Thoma | 91/489 |
| 2,297,518 A | * | 9/1942 | Wegerdt | 91/505 |
| 2,362,667 A | * | 11/1944 | Schmidt | 384/305 |
| 2,543,624 A | * | 2/1951 | Gabriel | 91/485 |
| 2,615,766 A | * | 10/1952 | Wallace | 384/420 |
| 2,916,334 A | * | 12/1959 | Thoma | 384/369 |
| 2,975,720 A | * | 3/1961 | Schoellhammer | 384/368 |
| 3,011,452 A | * | 12/1961 | Budzich | 91/507 |
| 3,011,453 A | * | 12/1961 | Budzich | 91/485 |
| 3,036,434 A | * | 5/1962 | Hing | 60/456 |
| 3,051,093 A | * | 8/1962 | Budzich | 91/485 |
| 3,120,816 A | * | 2/1964 | Firth et al. | 92/110 |
| 3,249,061 A | * | 5/1966 | Ricketts | 91/486 |
| 3,289,606 A | * | 12/1966 | Bosch | 91/485 |
| 3,497,273 A | * | 2/1970 | Gerrit et al. | 384/113 |
| 3,521,532 A | * | 7/1970 | Vinnicombe et al. | 92/57 |
| 3,768,377 A | * | 10/1973 | Engel et al. | 91/486 |
| 4,383,771 A | * | 5/1983 | Freytag et al. | 384/121 |
| 4,726,695 A | * | 2/1988 | Showalter | 384/121 |
| 5,105,723 A | * | 4/1992 | Kazahaya et al. | 91/485 |
| 5,174,660 A | | 12/1992 | Seibig | |
| 5,829,338 A | * | 11/1998 | Chrestoff et al. | 92/12.2 |
| 7,387,442 B2 | * | 6/2008 | Spikes | 384/276 |
| 2007/0116391 A1 | | 5/2007 | Watai et al. | |
| 2008/0205805 A1 | * | 8/2008 | Bauer | 384/123 |

FOREIGN PATENT DOCUMENTS

| | | |
|---|---|---|
| JP | 2005256868 | 9/2005 |
| JP | 2009242747 | 10/2009 |
| WO | WO0188217 | 11/2001 |
| WO | 2004070219 | 8/2004 |

* cited by examiner

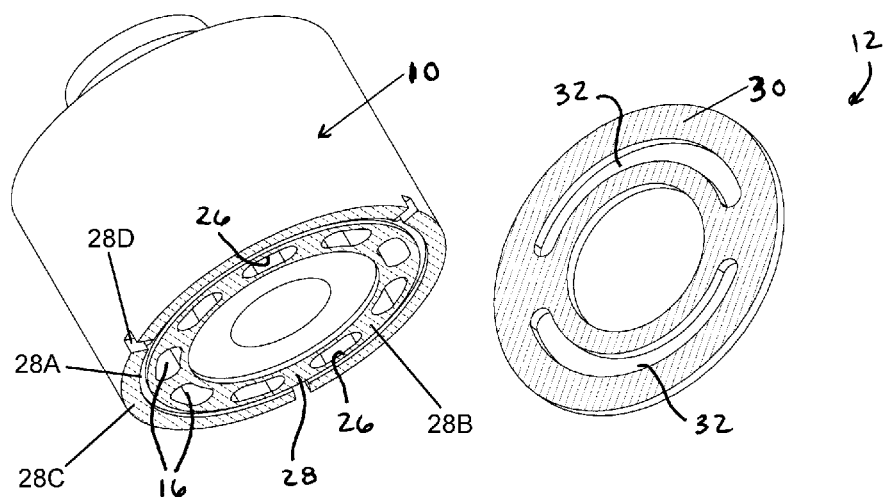
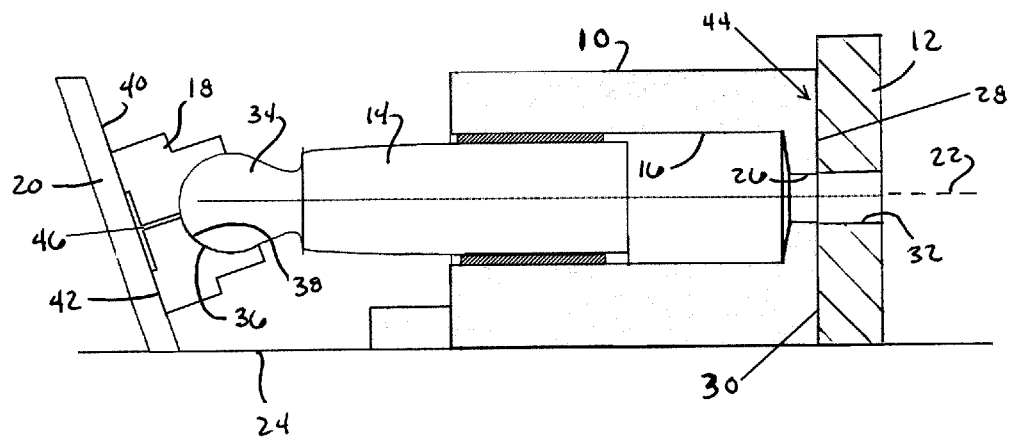
FIG. 1
FIG. 2

AXIAL SLIDING BEARING AND METHOD OF REDUCING POWER LOSSES THEREOF

CROSS REFERENCE TO RELATED APPLICATIONS

This application claims the benefit of U.S. Provisional Application No. 61/041,257, filed Apr. 1, 2008, the contents of which are incorporated herein by reference.

This invention was made with Government support under Award EEC-0540834 awarded by the National Science Foundation. The Government has certain rights in this invention.

BACKGROUND OF THE INVENTION

The present invention generally relates to hydrostatic sliding bearings, including hydrostatic sliding bearings suitable for use in positive displacement machines.

Positive displacement pumps and motors, such as axial and radial piston machines, generally comprise an array of pistons that reciprocate within a cylinder block. In axial piston machines, the piston-cylinder combinations are parallel and arranged in a circular array within the cylinder block. An inlet/outlet port is defined at one end the cylinder block for each individual piston-cylinder combination, such that a fluid can be drawn into and expelled from each cylinder through the port as the piston within the cylinder is reciprocated. The end of the cylinder block containing the inlet/outlet ports defines an axial sliding bearing surface that abuts a surface of a valve plate, while the opposite end of the cylinder block is connected to a drive shaft for rotation of the cylinder block. The valve plate defines an inlet opening and an outlet opening that are sequentially aligned with the inlet/outlet of each cylinder, so that fluid is drawn into each cylinder through the cylinder's inlet/outlet port when aligned with the valve plate inlet opening and expelled from each cylinder through the cylinder's inlet/outlet port when aligned with the valve plate outlet opening. The mating surfaces of the cylinder block and valve plate are axial sliding bearing surfaces separated by a film of the fluid being worked on by the machine, defining a hydrostatic axial sliding bearing that is subjected to an axial load applied by the cylinder block to the valve plate. In addition to carrying this axial load, the axial sliding bearing must also minimize fluid leakage between the block and valve plate. Consequently, the axial sliding bearing has both a bearing function and a sealing function, which differentiates the hydrostatic axial sliding bearing from typical bearing applications that have only a load-bearing function.

While the axial sliding bearing of a positive displacement machine is often referred to as a hydrostatic bearing, it is well known that there are hydrodynamic effects present that influence the load-bearing and sealing functions of the bearing as the cylinder block rotates relative to the valve plate. Nonetheless, for convenience sliding bearings of positive displacement machines and similar applications will be referred to herein simply as hydrostatic bearings.

One end of each piston protrudes from the cylinder block and is coupled with a stationary swash plate inclined to the axis of the cylinder block, causing the pistons to reciprocate within the cylinder block as the block is rotated relative to the swash plate. The stroke length of each piston, and therefore displacement of the piston-cylinder combinations, can be made variable by changing the inclination (cam angle) of the swash plate. To provide this capability, the protruding end of each piston may be configured to have a ball-and-socket arrangement. The socket portion of this arrangement, or slipper, may have a planar surface that bears against the swash plate. The spherical mating surfaces of each piston-slipper combination and the planar mating surfaces of the swash plate and each slipper define axial sliding bearing surfaces, which are separated by a fluid film formed with, for example, the fluid being worked on. The resulting hydrostatic axial sliding bearings transfer the piston force to the swash plate during relative motion between the slipper and swash plate.

Axial sliding bearing surfaces similar to those described above can also be found in other machines, including other positive displacement machines such as bent axis piston machines, radial piston machines, vane type machines, gear machines, screw-type machines, etc.

The efficiencies of machines with sliding bearing surfaces are dependent on the torque losses attributable to each sliding bearing surface. For positive displacement machines, efficiencies are also dependent on power losses attributable to fluid leakage at the axial sliding bearing surfaces defined by the cylinder block and valve plate. Designs for axial sliding bearings are widely known and described in the literature. For example, descriptions of axial sliding bearings for different positive displacement machines can be found in Ivantysyn J. and Ivantysynova, M., Hydrostatic pumps and motors, New Delhi. Akademia Books International, ISBN-81-85522-16-2 (2001). Design principles and calculation methods typically assume that the gap height between the sliding bearing surfaces is uniform. Using the axial piston machine described above as an example, the sliding bearing surfaces of the planar mating surfaces of the cylinder block and valve plate and the planar mating surfaces of the slippers and swash plate are assumed to be parallel, and the sliding bearing surfaces of the spherical ball-and-socket mating surfaces of the pistons and slipper are assumed to be perfectly spherical and concentric. For manufacturing purposes, absolute deviations of flatness are defined in ranges of micrometers. It is also common practice to assume ideally smooth surfaces within the sizing process, and to allow a minimum surface roughness for manufacturing purposes, typically less than a one micrometer Ra and more typically in a range of thousandths to tenths of a micrometer, requiring an abrasive finishing operation such as lapping. Common design principles and calculation methods further assume that the fluid film between the sliding bearing surfaces is of constant thickness.

A disadvantage of the above commonly-used design approach is that, in the event of an asymmetrical bearing load during relative motion between the sliding surfaces, the surfaces will incline with respect to each other and form a gap of variable height, leading to hydrodynamic effects. In the case of axial sliding bearings used in positive displacement machines, inclination of the surfaces can lead to conditions with very low gap heights on one side and very high gap heights on the opposite side. Such conditions increase friction in areas of relatively small gap heights and increase leakage in locations of relatively large gap heights, resulting in increased power losses of the machine and reduced machine efficiency. This problem is common for all asymmetrically-loaded axial sliding bearings that have a sealing function in addition to a sliding bearing function.

In view of the above, there is a desire to minimize power losses, resulting from friction and/or fluid leakage, in machines with hydrostatic axial sliding bearing surfaces.

BRIEF DESCRIPTION OF THE INVENTION

The present invention provides a machine having one or more hydrostatic axial sliding bearings capable of exhibiting reduced power losses, and to a method for configuring a machine having one or more hydrostatic axial sliding bearings so that the machine exhibits reduced power losses.

According to a first aspect of the invention, the machine has at least two axial sliding bearing surfaces that are adapted for movement relative to each other during operation of the machine and are separated by a fluid film to define at least one hydrostatic axial sliding bearing having bearing and sealing functions. The machine further comprises a first element that defines a first of the axial sliding bearing surfaces and a second element that defines a second of the axial sliding bearing surfaces. In combination, the first and second axial sliding bearing surfaces function as bearing and sealing surfaces for the hydrostatic axial sliding bearing. The machine is adapted so that the first and second axial sliding bearing surfaces move relative to each other in a first direction of motion, and at least the second axial sliding bearing surface has a surface profile comprising an oscillatory waveform in the first direction of motion.

According to a second aspect of the invention, the method involves reducing power losses of a machine having at least two axial sliding bearing surfaces separated by a fluid film to define at least one hydrostatic axial sliding bearing. The machine comprises first and second elements that define a first and a second of the axial sliding bearing surfaces, respectively, that move relative to each other in a first direction of motion. The method then entails forming at least the second axial sliding bearing surface to have a surface profile comprising an oscillatory waveform in the first direction of motion.

The invention is applicable to a wide variety of machines, including positive displacement machines, particular examples of which include axial and radial piston pumps and motors. In the example of an axial piston machine, the axial sliding bearings may be formed by mating surfaces of a rotating cylinder block and a valve body, with one of the mating surfaces being modified to be a structured sliding surface comprising the oscillatory waveform. The oscillatory waveform can have various dimensions and a variety of micro-profiles, including symmetrical and asymmetrical oscillatory waveforms capable of generating additional hydrodynamic effects that can reduce power losses when there is relative motion between the mating surfaces. The profile and dimensions of the oscillatory waveform can be tailored to achieve an increased load-carrying capability, which can permit reduced power losses and/or allow for reductions in the surface areas of the axial sliding bearing surfaces. The profile and dimensions of the oscillatory waveform can also be tailored to achieve reduced volumetric losses. The benefits are particularly significant if the axial sliding bearing is asymmetrically loaded.

Other aspects and advantages of this invention will be better appreciated from the following detailed description.

BRIEF DESCRIPTION OF THE DRAWINGS

FIG. 1 shows perspective views of a cylinder block and a valve plate representative of components of an axial piston machine.

FIG. 2 is a cross-sectional view of one-half of an assembly comprising a cylinder block, a piston, a slipper, and a swash plate as representative components of an axial piston machine.

DETAILED DESCRIPTION OF THE INVENTION

Figure 3:
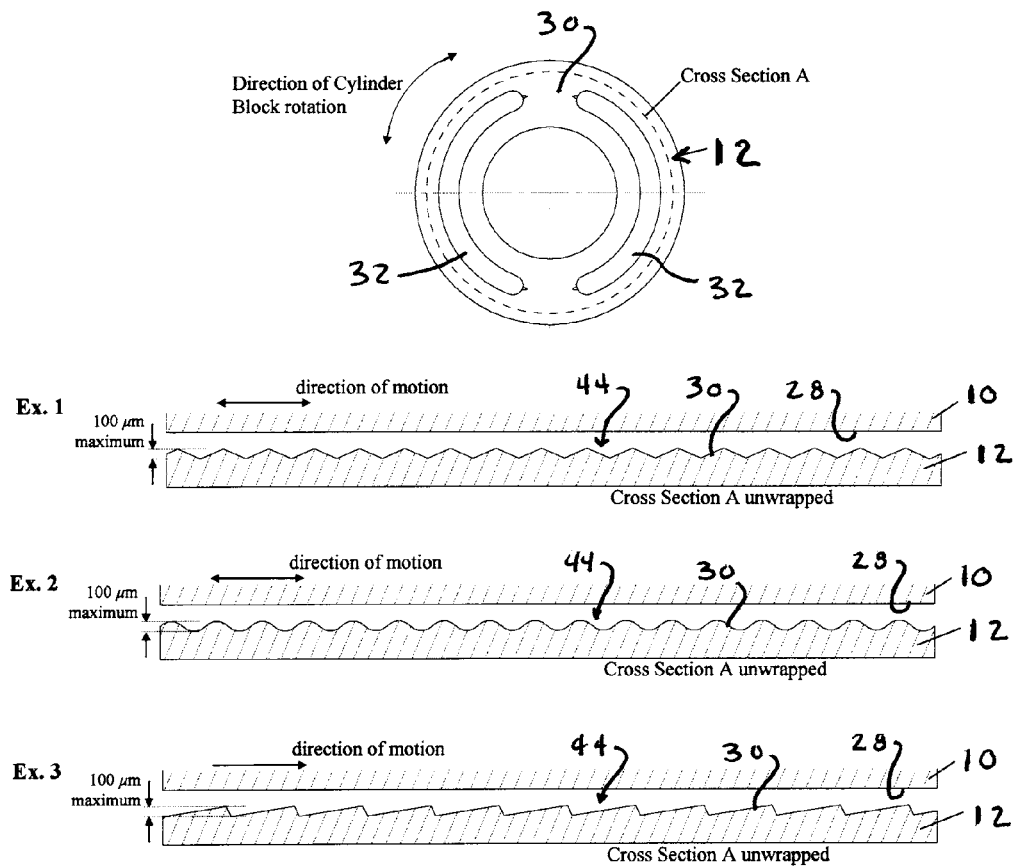
FIG. 3 shows a plan view of the valve plate of FIG. 1 and three nonlimiting examples of structured surfaces that can be formed on an axial sliding bearing surface of the valve plate.

The invention provides a hydrostatic axial sliding bearing that has both bearing and sealing functions and is characterized by reduced power losses, corresponding to reduced friction, when subjected to either a symmetrical or nonsymmetrical load. FIG. 1 is representative of a cylinder block 10 and valve plate 12 suitable for use in an axial piston machine. FIG. 2 schematically represents a cross-sectional view of one-half of the cylinder block 10, and shows a piston 14 received within a cylinder bore 16 of the cylinder block 10, a slipper 18 coupled to one end of the piston 14, and a swash plate 20 abutting the slipper 18. Consistent with conventional axial piston machines, the piston 14 and bore 16 define an axis 22 that is parallel to the axis 24 of the cylinder block 10. While the invention will be described in reference to an axial piston machine and the components represented in FIGS. 1 and 2, it should be understood that the invention is applicable to a variety of other machines capable of utilizing a hydrostatic axial sliding bearing, including other positive displacement pumps and motors such as bent axis piston machines, radial piston machines, vane type machines, gear machines, screw-type machines, etc. All such applications are within the scope of this invention.

The cylinder block 10 represented in FIG. 1 comprises a circular array of parallel cylinder bores 16, each of which receives a piston 14 in a manner similar to that represented in FIG. 2. The cylinder block 10 is formed to have an inlet/outlet port 26 for each of the cylinder bores 16, such that a fluid can be drawn into and expelled from each cylinder bore 16 through the port 26 as the piston 14 within the bore 16 is reciprocated. The end of the cylinder block 10 containing the inlet/outlet ports 26 defines an axial sliding bearing surface 28 that abuts an axial sliding bearing surface 30 of the valve plate 12, represented in FIG. 2 as having an axis that coincides with the axis 24 of the cylinder block 10. Though not shown, it is well known in the art to configure the opposite end of the cylinder block 10 for connection to a drive shaft for rotation of the block 10 relative to the stationary valve plate 12. The valve plate 12 defines a pair of arcuate inlet and outlet slots 32, which are depicted as having the same radius of curvature from the axis 24 so as to axially align with the inlet/outlet ports 26 of the cylinder bore 16 as the cylinder block 10 rotates relative to the valve plate 12. However, it is foreseeable that the slots 32 could have different radii of curvature, and that the placement and shape of the slots 32 could differ from what is depicted in FIG. 1. Which of the slots 32 will serve as the inlet and which will serve as the outlet will depend on the directional rotation of the cylinder block 10 relative to the valve plate 12. Regardless of rotational direction, the slots 32 are sequentially aligned with the inlet/outlet port 26 of each cylinder bore 16 so that, as evident from FIG. 2, fluid is drawn into each bore 16 through its inlet/outlet port 26 while aligned with the inlet slot 32 of the valve plate 12 and expelled through its inlet/outlet port 26 while aligned with the outlet slot 32 of the valve plate 12.

When mated, the axial sliding bearing surfaces 28 and 30 of the cylinder block 10 and valve plate 12 are separated by a film (not shown) of the fluid being worked on, defining a hydrostatic axial sliding bearing that exhibits hydrodynamic effects as the block 10 rotates relative to the valve plate 12. To minimize fluid leakage, the block 10 and valve plate 12 are held together or otherwise subjected to an axial load that limits the gap distance (height) between the block 10 and plate 12. In the configuration shown in FIG. 1, the bearing surface 28 of the cylinder block 10 is represented as having a ring groove 28A that is coaxial with the axis 24 of the block 10 and fluidically connected (vented) with slots 28D to the perimeter of the bearing surface 28. The groove 28A delineates two distinct lands 28B and 28C on the bearing surface 28. The land 28B circumscribed by the groove 28A will be referred to as a sealing land 28B in view of the inlet/outlet ports 26 of the cylinder block 10 being located within the sealing land 28B, such that the sealing function required of the hydrostatic axial sliding bearing is likely to be primarily performed by the land 28B. The remaining land 28C circumscribing the groove 28A will be referred to as a bearing land 28C, as its primary function is likely to be the load-bearing function required of the hydrostatic axial sliding bearing as a result of the groove 28A being vented to whatever pressure (likely atmospheric) that surrounds the cylinder block 10. However, it should be noted that both lands 28B and 28C are likely to share in the load-bearing function. In addition, it is foreseeable that the bearing surface 28 of the cylinder block 10 could be modified to enable the bearing land 28C to contribute to the sealing function of the hydrostatic axial sliding bearing.

As presented in FIG. 2, one end of each piston 14 protrudes from its bore 16 in the cylinder block 10 and engages the slipper 18. The slipper 18 engages the swash plate 20, which is stationary and inclined to the axis 24 of the cylinder block 10 to cause the pistons 14 to reciprocate within the cylinder block 10 as the block 10 is rotated relative to the swash plate 20. To provide a variable stroke/displacement capability, the assembly represented in FIG. 2 is configured to allow the inclination (cam angle) of the swash plate 20 to be altered relative to the cylinder block axis 24. In particular, the protruding end 34 of the piston 14 has a spherical surface 36 that engages a complementary spherical-shaped socket 38 formed in the slipper 18, providing a ball-and-socket coupling that allows the end 34 of the piston 14 to rotate and pivot within the socket 38 as the cylinder block 10 rotates and the slipper 20 follows a circular path on the facing surface 40 of the swash plate 20. The slipper 18 has a planar surface 42 that bears against the surface 40 of the swash plate 20. The planar mating surfaces 40 and 42 of the swash plate 20 and each slipper 18 define axial sliding bearing surfaces. Each pair of bearing surfaces 40 and 42 is separated by a lubricating fluid film. For example, the film may be supplied by fluid drawn from the cylinder bore 16, through the piston 14, and through a passage 46 in the slipper 18. The resulting hydrostatic axial sliding bearings provide a load-bearing function that transfers the piston forces to the swash plate 20 as the slippers 18 orbit the surface 40 of the swash plate 20. The bearing surfaces 40 and 42 also provide a sealing function that limits fluid leakage from the interface between the slipper 16 and swash plate 20. As with the bearing surface 28 of the cylinder block 10, separate sealing and load-bearing regions could be delineated on the bearing surface 42 of the slipper 18, for example, with a groove that may or may not be vented to the surrounding atmosphere.

For purposes of discussing the present invention, other relevant structural and functional aspects of the axial piston machine and its axial sliding bearings represented in FIGS. 1 and 2 will be well understood by those skilled in the art, and therefore will not be discussed in further detail here.

FIG. 3 contains an axial view of the axial sliding bearing surface 30 of the valve plate 12, and represents a cross-section line "A" that is the basis for three unwrapped cross-sectional views representing three of the various surface profiles 44 envisioned by this invention. As evident from FIG. 3, the cross-section line A defines a circular path on the bearing surface 30 of the valve plate 12 and has an axis that, after mating the cylinder block 10 to the valve plate 12, will coincide with the axis 24 of the cylinder block 10 such that the instantaneous direction of motion of a point on the profile 44 lying on the circular path is tangential to the circular path. As evident from FIG. 4, because the oscillatory waveforms of the profiles 44 lie on a circular path, the peaks and valleys of the waveforms lie on radials of the path axis.

The surface profile 44 is preferably present on at least the portion of the valve plate bearing surface 30 that surrounds the valve plate inlet/outlet slots 32 and will face the sealing land 28B of the cylinder block 10 when the block 10 and valve plate 12 are mated. The profile 44 may also extend toward the perimeter of the valve plate bearing surface 30, so as to face the bearing land 28C of the cylinder block 10 when the block 10 and valve plate 12 are mated. The bearing surface 28 of the cylinder block 10 is represented in FIG. 3 as being smooth and lacking a profile 44, though it should be understood that a profile 44 could be provided at the bearing surface 28 instead of or in addition to the profile 44 on the valve plate bearing surface 30. Consistent with the aforementioned sealing function of the sealing land 28B, a profile 44 provided on the bearing surface 28 would preferably be present on at least the sealing land 28B of the cylinder block 10, though may also extend into the bearing land 28C at the perimeter of the bearing surface 28.

The profiles 44 represented in Examples 1, 2 and 3 of FIG. 3 will be referred to as triangular, sinusoidal, and sawtooth, consistent with the ordinary use and meaning of these terms in reference to oscillatory waveforms. The triangular and sinusoidal profiles 44 are understood to be symmetrical, whereas the sawtooth profile 44 can be seen to be asymmetrical. Other variations of symmetrical and asymmetrical oscillatory waveforms are foreseeable and therefore also within the scope. The oscillatory waveforms may have a wide range of peak-to-peak amplitudes, with a suitable maximum amplitude believed to be about one hundred micrometers. A minimum peak-to-peak amplitude is believed to be at least 0.1 micrometer. In the absence of a profile 44 (for example, the bearing surface 28 in FIG. 3), the bearing surfaces 28/30 may have a surface roughness that is an order of magnitude lower than the peak-to-peak amplitude of the oscillatory waveform.

The oscillatory waveforms of the profiles 44 represented in FIG. 3 are intended to generate additional hydrodynamic effects for the axial sliding bearing surfaces of the assemblies shown in FIGS. 1 and 2, which are often asymmetrically loaded, particularly in view of the common practice of using an odd number of pistons 14. The asymmetric loading of the bearing surfaces incurs power losses in conventional axial sliding bearings that can be reduced by hydrodynamic effects provided by the invention. It is believed an oscillatory waveform for the surface profile 44 and its dimensions can be defined to minimize power losses over a range of operating conditions. A surface profile 44 also has the ability to increase the load-carrying capability of the axial sliding bearing and/or allow for reductions in the surface areas of the axial sliding bearing surfaces.

Figure 4:
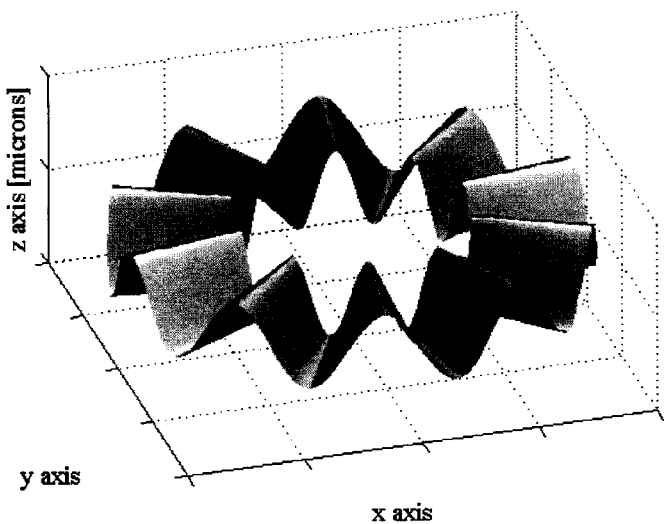
FIG. 4 is a graph plotting a profile for a structured surface of the valve plate, wherein the profile has a sinusoidal waveform.

In investigations leading to the present invention, sinusoidal waveforms (Example 2 of FIG. 3) were chosen to be modeled and analyzed using a proprietary computer model. The waveforms were analyzed as present on an otherwise conventional axial piston pump design with nine pistons. For comparison, the identical axial piston pump (minus a surface profile) was also modeled and analyzed in the investigation as a baseline ("standard") model. Three simulation models were assessed, identified as DM.7, DM.8 and DM.9. For the simulation and standard models, the displacement volume ($V_i$) of the pump per rotation was set at 75 cc. For the simulation model identified as DM.7, the surface profile consisted of ten full sinusoidal waves along the circumferential direction of the cylinder block/valve plate surface, as represented in FIG. 4. The amplitude of the DM.7 waveform was +/−2 micrometers. The simulation model identified as DM.8 also had a surface profile consisting of ten full sinusoidal waves (FIG. 4), but with an amplitude of +/−1 micrometer. The simulation model identified as DM.9 had a surface profile consisting of fifteen full sinusoidal waves with an amplitude of +/−1 micrometer. Finally, the standard model was simulated to have a smooth planar bearing surface. Because the models were otherwise identical, other structural and dimensional aspects of the models are not deemed to be necessary for an understanding of the investigation and its results, and therefore are not reported here.

For each model, variations in six operating conditions were simulated. The approximate operating conditions are summarized in Table I below.

TABLE 1

Simulation Parameters

| Operating Condition | Δp [bar] | n [rpm] | $p_{HP}$ [bar] | $p_{LP}$ [bar] | $T_{HP}$ [° C.] | $T_{LP}$ [° C.] | $T_{CASE}$ [° C.] | β [%] |
|---|---|---|---|---|---|---|---|---|
| #1 | 100 | 1000 | 120 | 20 | 48 | 47 | 64 | 100 |
| #2 | 300 | 1000 | 320 | 20 | 56 | 54 | 67 | 100 |
| #3 | 300 | 3000 | 320 | 20 | 54 | 48 | 94 | 100 |
| #4 | 100 | 1000 | 120 | 20 | 54 | 51 | 62 | 17 |
| #5 | 300 | 1000 | 320 | 20 | 70 | 55 | 73 | 17 |
| #6 | 300 | 3000 | 320 | 20 | 61 | 52 | 91 | 17 |

With reference to the components as identified in FIGS. 1 through 3, Δp is the system pressure differential between the inlet and outlet slots 32 of the valve plate 12, n is the rotational speed of the cylinder block 10, $p_{HP}$, is the pressure at the high pressure (outlet) port, $p_{LP}$, is the pressure at the low pressure (inlet) port, $T_{HP}$ is the fluid temperature at the high pressure port, $T_{LP}$ is the fluid temperature at the low pressure port, $T_{CASE}$ is the temperature of the cylinder block 10, and β is the inclination of the swash plate 20 relative to the axis 24 of the cylinder block 10. A swash plate angle of 100% refers to a maximum inclination angle, corresponding to a maximum displacement for the machine.

Simulations were performed with the computer model to determine three-dimensional gap heights, three-dimensional pressure fields, leakage losses, and torque losses for the standard model and the three simulation models DM.7, DM.8 and DM.9.

Figure 5:
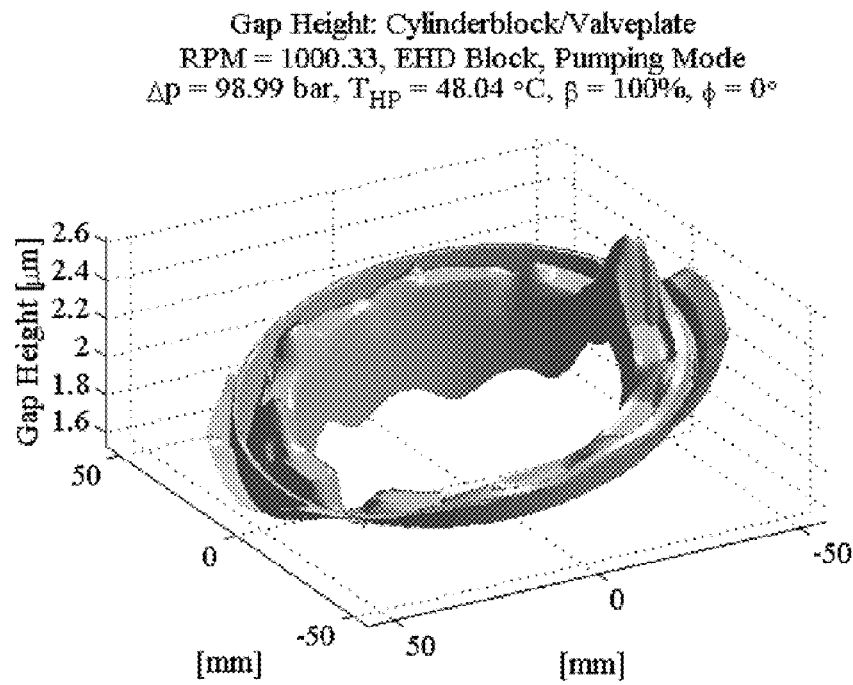
FIG. 5 is a graph plotting the calculated gap height between a prior art cylinder block and valve plate predicted by a computer model as the cylinder block rotates relative to the valve plate.
Figure 6:
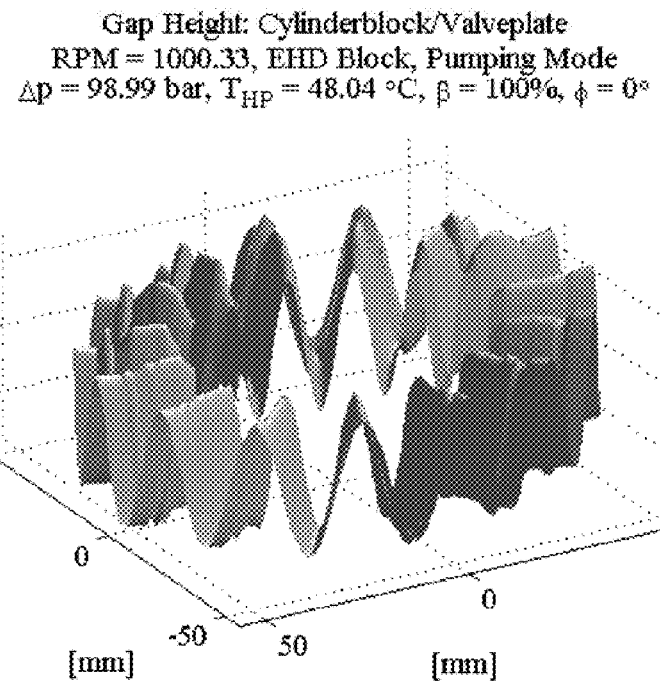
FIG. 6 is a graph plotting the calculated gap height between a cylinder block and valve plate predicted by the computer model as the cylinder block rotates relative to the valve plate, wherein the bearing surface of the valve plate has a structured surface having a profile with a sinusoidal waveform in accordance with an embodiment of this invention.

In the simulation, as the cylinder block rotates the resulting external force pressing the cylinder block 10 against the valve plate 12 varies and causes a change of gap height between the cylinder block 10 during the course of one revolution. FIGS. 5 and 6 are graphs comparing the three-dimensional gap heights for the standard model and the DM.9 simulation model, respectively, at operating condition #1 (Table I) while the cylindrical block was at a specified rotational position (φ) designated as 0 degrees for the simulation. As evident from FIGS. 5 and 6, the gap height around the circumference of the standard model is highly asymmetric, while the gap height around the circumference of the simulation model is sinusoidal but highly symmetric. The results depicted in FIGS. 5 and 6 are representative of additional results that were obtained at rotational positions (φ) corresponding to angles of 45, 90, 135, 180, 225, 270, and 315 degrees.

Figure 7:
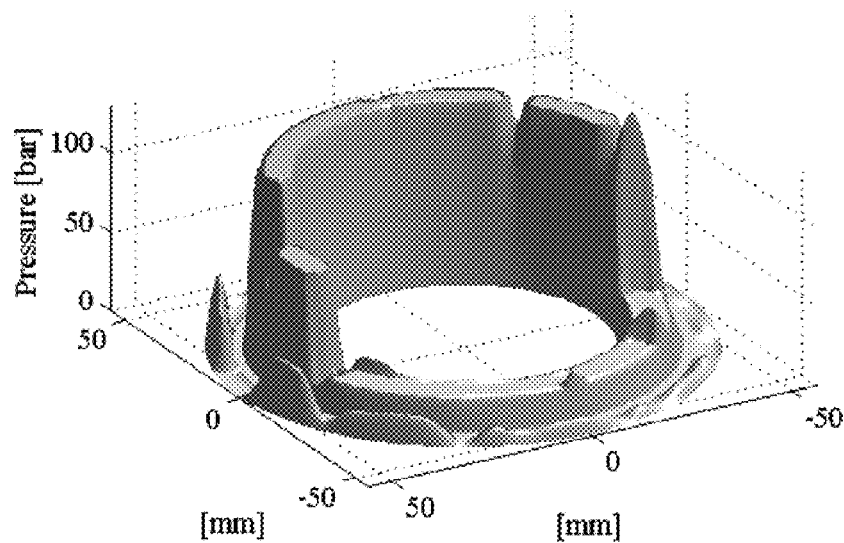
FIG. 7 is a graph plotting the calculated pressure field distribution between the modeled prior art cylinder block and valve plate of FIG. 5 as predicted by the computer model.
Figure 8:
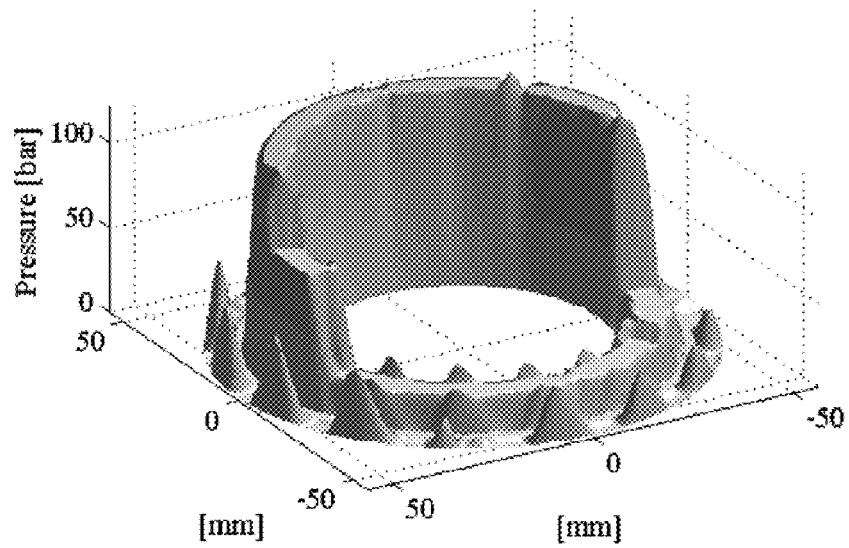
FIG. 8 is a graph plotting the calculated pressure field distribution between the modeled cylinder block and valve plate of FIG. 6 as predicted by the computer model.

FIGS. 7 and 8 are graphs comparing the three-dimensional pressure field for the standard model and the DM.9 simulation model, respectively, at operating condition #1 while the cylindrical block was at the rotational position (φ) of 0 degrees. As would be expected from the different fluid pressures at the inlet and outlet slots 32 of the valve plate 12, FIGS. 7 and 8 evidence that the pressure fields are asymmetric for both the standard and DM.9 simulation models. The results depicted in FIGS. 7 and 8 are representative of additional results obtained at rotational positions (φ) corresponding to angles of 45, 90, 135, 180, 225, 270, and 315 degrees.

Figure 9:
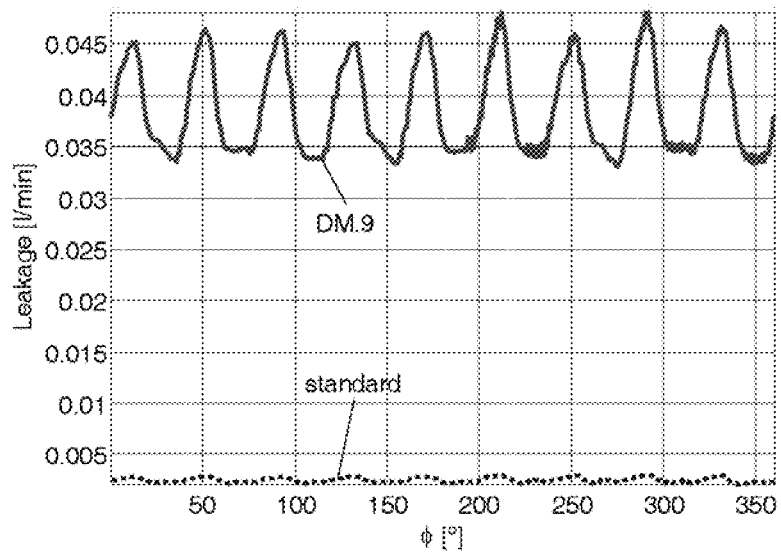
FIG. 9 is a graph plotting the calculated leakage between the modeled prior art cylinder block and valve plate of FIG. 5 and between the modeled cylinder block and valve plate of FIG. 6 as predicted by the computer model for one full revolution of their respective cylinder blocks.
Figure 10:
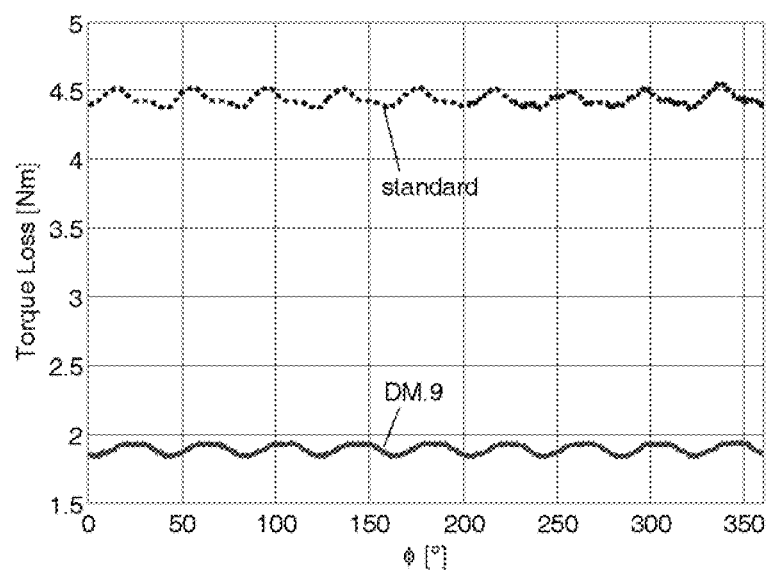
FIG. 10 is a graph plotting the torque losses for the modeled prior art cylinder block and valve plate of FIG. 5 and the modeled cylinder block and valve plate of FIG. 6 as predicted by the computer model for one full revolution of their respective cylinder blocks.
Figure 11:
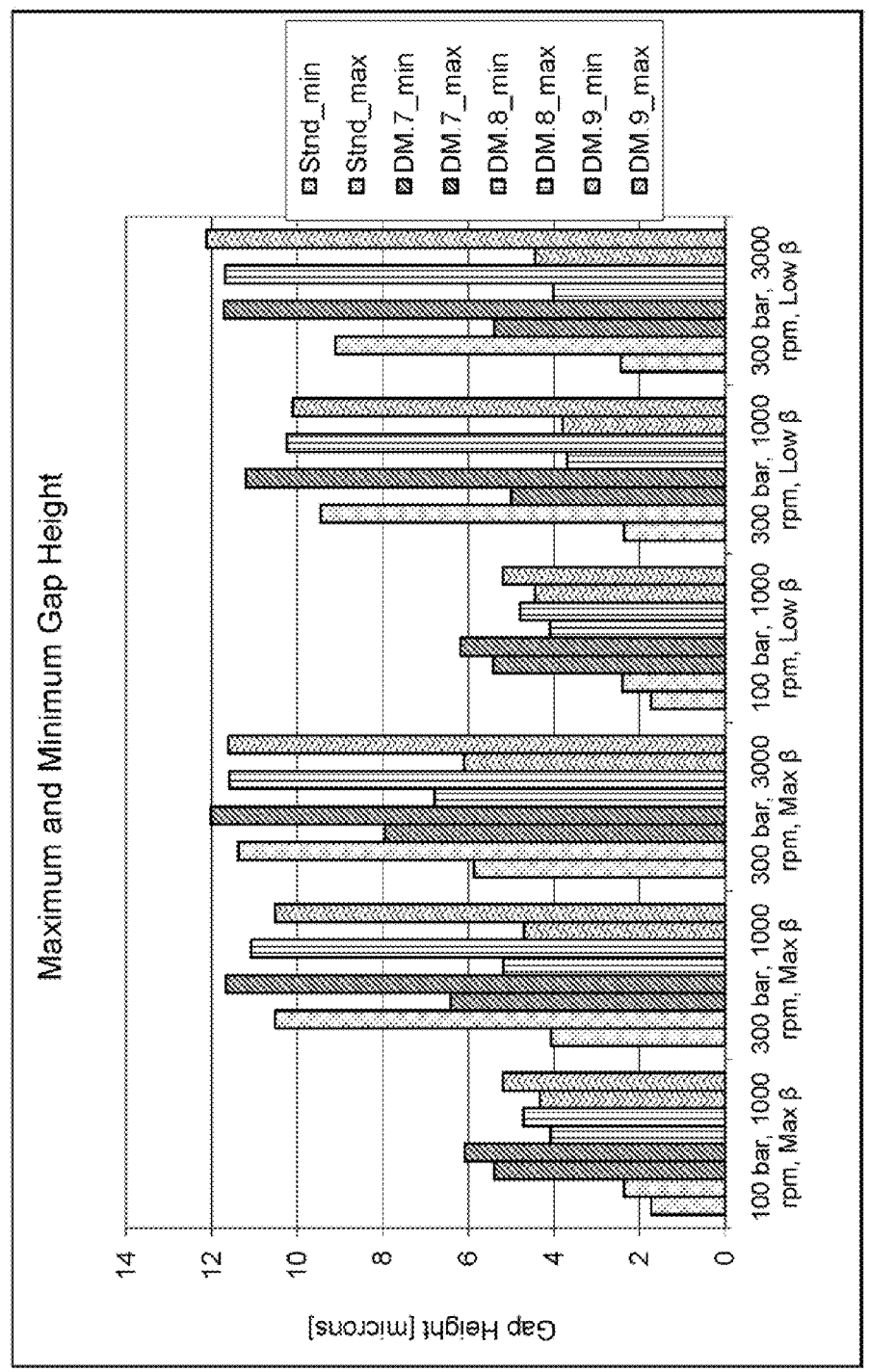
FIG. 11 is a bar graph comparing the maximum and minimum gap heights predicted by the computer model under selected operating conditions for the prior art cylinder block and valve plate of FIG. 5, the cylinder block and valve plate of FIG. 6, and two additional cylinder block and valve plate pairs in accordance with additional embodiments of the invention.
Figure 12:
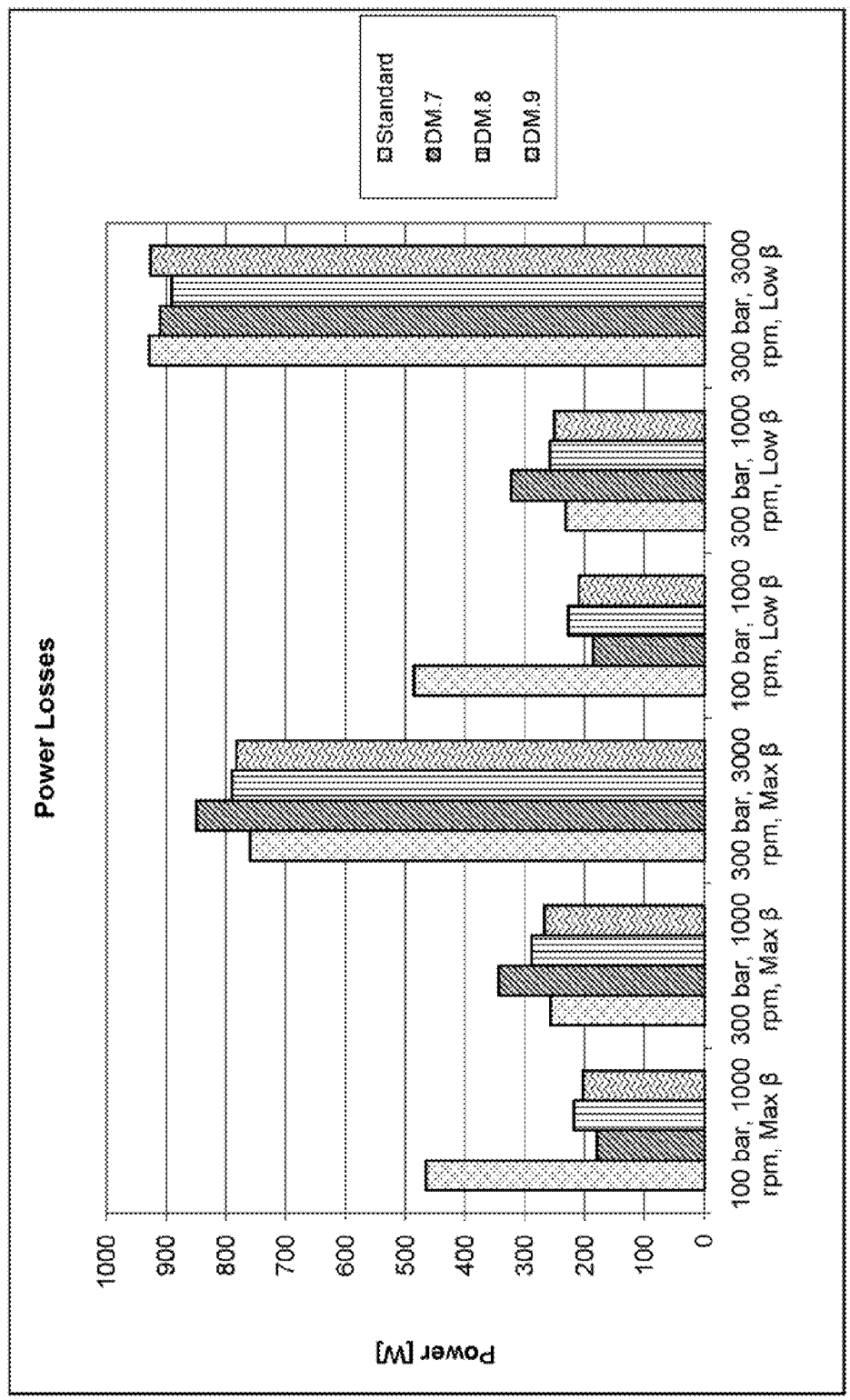
FIG. 12 is a bar graph comparing the power losses predicted by the computer model for each of the cylinder block and valve plate pairs of FIG. 11 and under the same selected operating conditions of FIG. 11.
Figure 13:
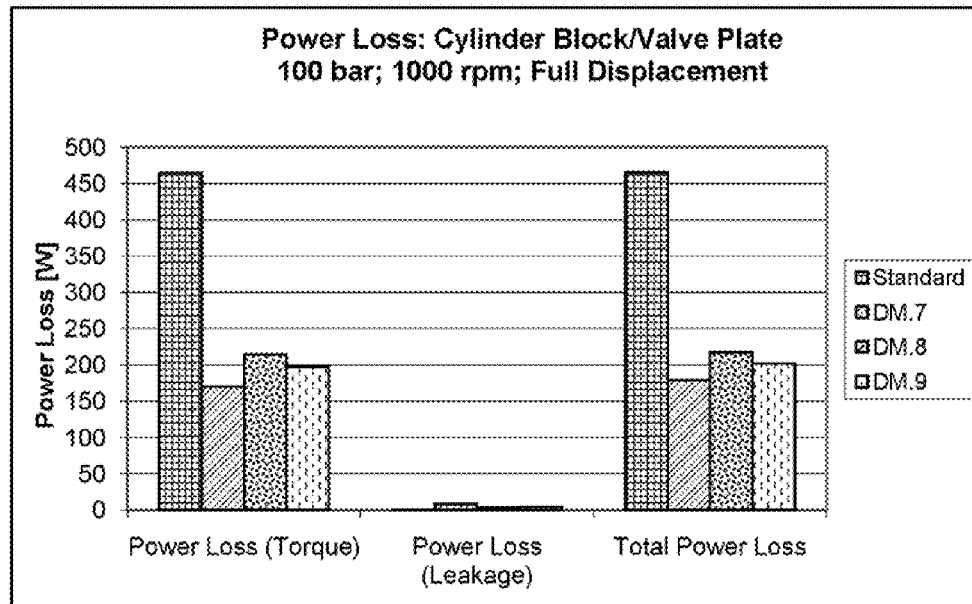
FIGS. 13 through 18 are bar graphs in which the power losses of FIG. 12 are separated into power losses attributable to fluid losses (leakage) and power losses attributable to torque losses for each of the cylinder block and valve plate pairs and each of the selected operating conditions of FIG. 12.
Figure 14:
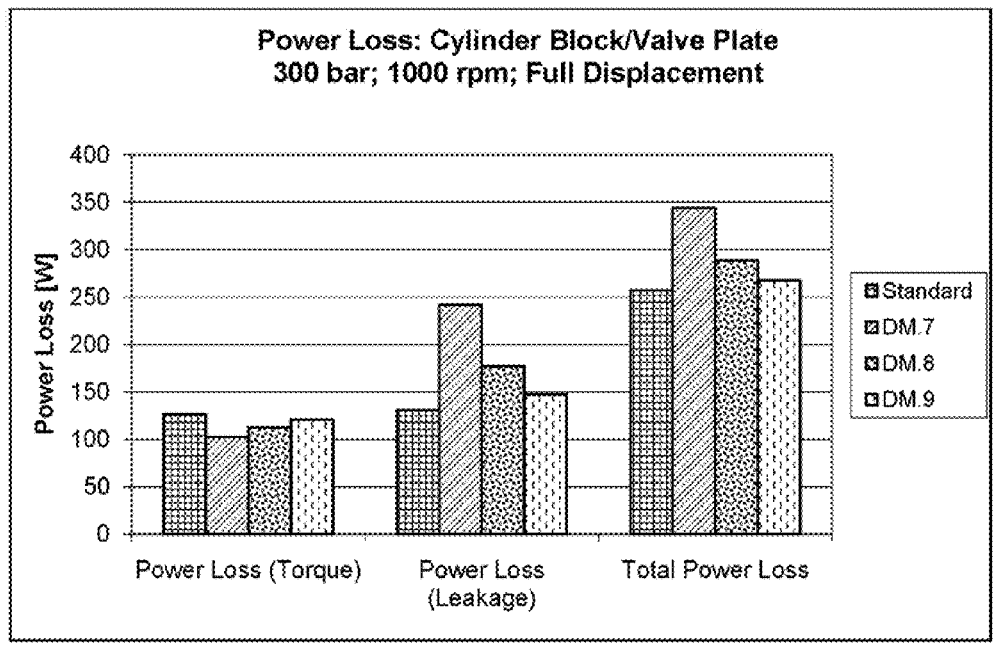
Figure 15:
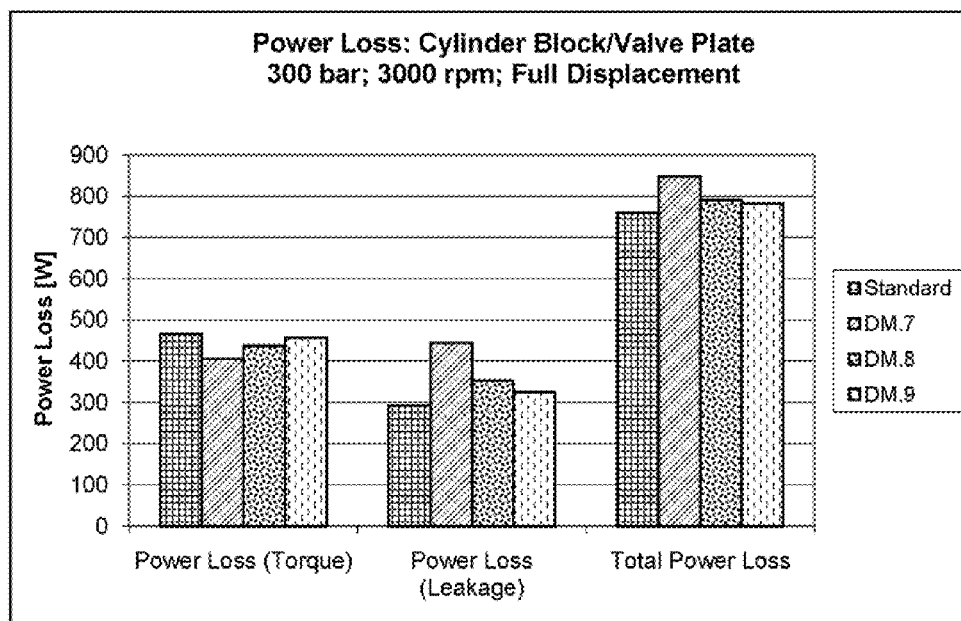
Figure 16:
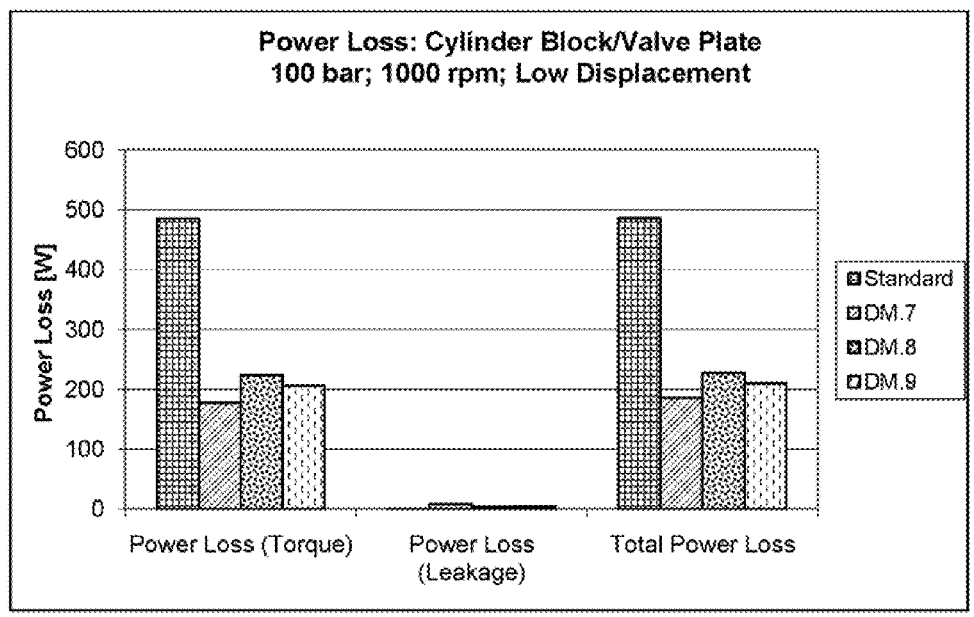
Figure 17:
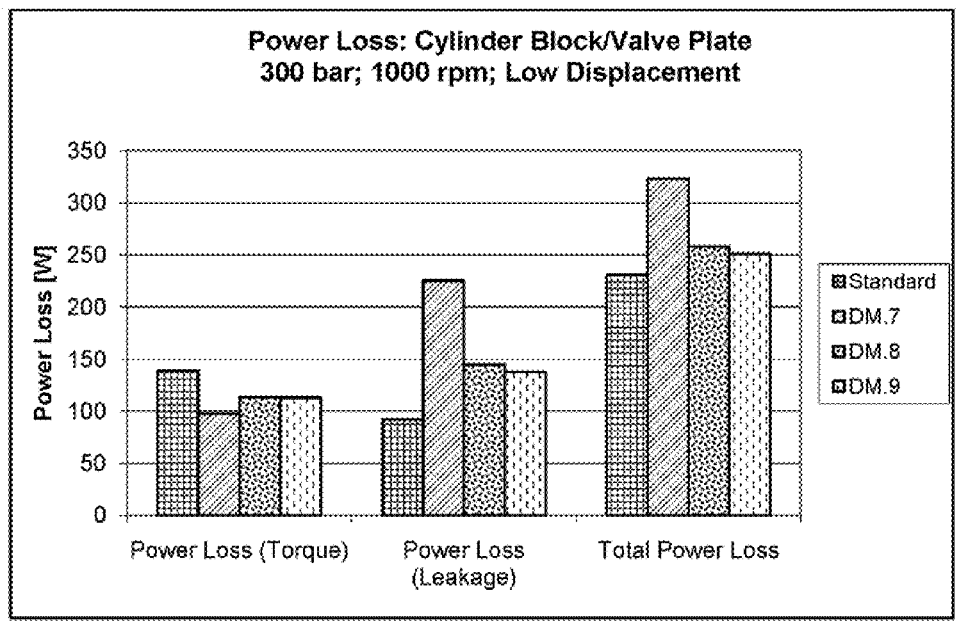
Figure 18:
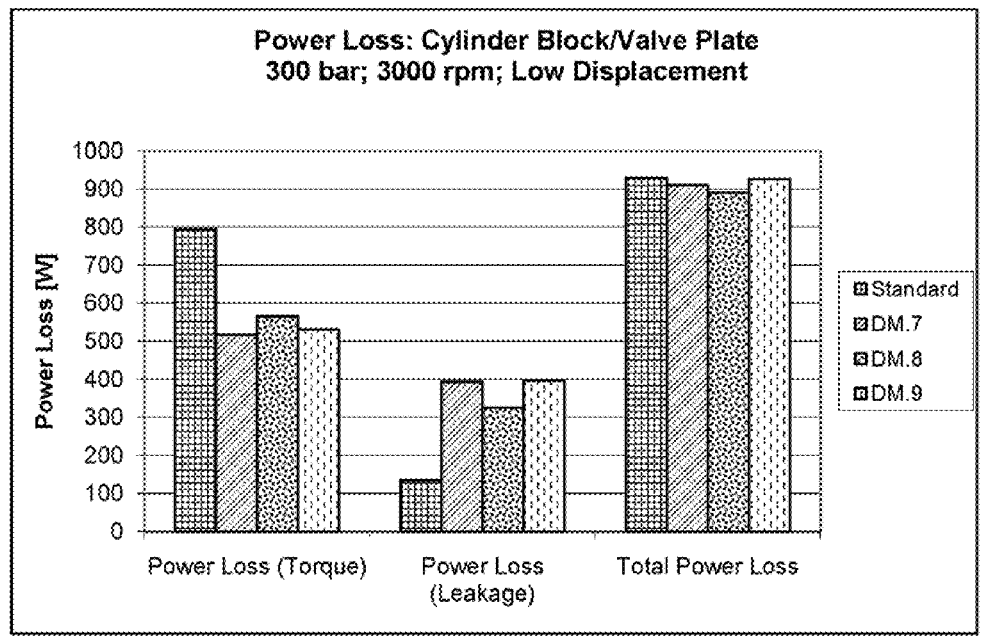

FIGS. 9 and 10 are graphs comparing the calculated leakage and torque losses for the standard model and the DM.9 simulation model over an entire revolution at operating condition #1. As would be expected, leakage is cyclic for the DM.9 simulation model, whereas the leakage calculated for the standard model is relatively lower and the cyclic effect is much less pronounced. However, FIG. 10 evidences that torque losses associated with the DM.9 simulation model are less than half of the torque losses associated with the standard model. Consequently, at least under the conditions of operating condition #1, the DM.9 simulation model caused a relative increase in fluid leakage and a significant decrease in torque losses.

FIGS. 11 through 18 are bar graphs comparing the average maximum and minimum gap heights and average power losses for the standard model and all three simulation models (DM.7, DM.8 and DM.9) over one full revolution of the cylinder block 10. For each angular position, φ, the computer model calculated maximum and minimum gap heights and power loss due to leakage ($P_q$) and friction at the interface of the cylinder block 10 and valve plate 12. As evident from FIGS. 11 through 18, the operation parameters used to compute the maximum/minimum gap heights and average power losses for the standard and simulation models were those identified as operating conditions #1 through #6 in Table 1, which include a system pressure differential (Δp) of 100 or 300 bar, a rotational speed (n) 1000 or 3000 rpm, and either a low (17%) or high (100%) displacement (β) of the swash plate 20.

The results plotted in FIGS. 11 through 18 evidence that the performances of the simulation models relative to the standard model were far better in terms of lower torque losses under most conditions. While the data appear to suggest that performance was dependent on the system pressure differential (Δp), it was concluded that this effect was attributable to the 300 bar pressure being near the capacity of the modeled pump. Subsequent simulations have shown that performance improvements can be achieved at pressures much higher than 300 bar. Experimental results have also verified the improved performance of hydrostatic axial bearing surfaces modified in accordance with the present invention, with actual reductions in power loss of about 10% being attained for axial piston machines.

While the invention has been described in terms of specific embodiments, it is apparent that other forms could be adopted by one skilled in the art. Therefore, the scope of the invention is to be limited only by the following claims.

The invention claimed is:

1. An axial piston machine comprising:
   a cylinder block adapted to be rotated about an axis of the axial piston machine;
   a plurality of cylindrical bores defined in the cylinder block and surrounding the axis;
   a plurality of pistons reciprocably disposed within the cylindrical bores; and
   a valve body having a fluid inlet through which a fluid enters the cylindrical bores and a fluid outlet through which the fluid leaves the cylindrical bores as the pistons reciprocate within the cylindrical bores, the fluid forming a fluid film within an interface between mating surfaces of the cylinder block and the valve body that face each other, the mating surface of the cylinder block having a sealing land and a bearing land, the machine configured such that the mating surfaces slidably move relative to each other in a first direction of motion while maintaining the interface therebetween and maintaining bearing and sealing functions thereat;
   wherein a surface profile comprising an oscillatory waveform is located at least either on the sealing land of the cylinder block or on a portion of the valve body that directly faces the sealing land of the cylinder block, the oscillatory waveform defining a circular path that is continuous in the first direction of motion, the oscillatory waveform having a peak-to-peak amplitude of less than one hundred micrometers, the oscillatory waveform producing a hydrodynamic sealing effect sufficient to provide a sealing function around the fluid inlet, the fluid outlet, and the cylindrical bores that limits fluid leakage from the fluid film within the interface as the mating surfaces slidably move relative to each other in the first direction of motion, the oscillatory waveform being a sinusoidal, a triangular, or a sawtooth waveform.

2. The axial piston machine according to claim 1, wherein the oscillatory waveform is a sinusoidal waveform.

3. The axial piston machine according to claim 1, wherein the oscillatory waveform is a triangular waveform.

4. The axial piston machine according to claim 1, wherein the oscillatory waveform is a sawtooth waveform.

5. The axial piston machine according to claim 1, wherein the oscillatory waveform is symmetrical.

6. The axial piston machine according to claim 1, wherein the oscillatory waveform is asymmetrical.

7. The axial piston machine according to claim 1, wherein the oscillatory waveform is located at least on the portion of the valve body that directly faces the sealing land of the cylinder block.

8. The axial piston machine according to claim 7, wherein the oscillatory waveform is further located on a portion of the valve body that directly faces the bearing land of the cylinder block.

9. The axial piston machine according to claim 1, wherein the oscillatory waveform has a peak-to-peak amplitude of at least 0.1 micrometer.

10. The axial piston machine according to claim 1, wherein either the sealing land of the cylinder block or the portion of the valve body that directly faces the sealing land of the cylinder block has a planar surface profile that does not comprise any oscillatory waveform.

11. The axial piston machine according to claim 10, wherein the planar surface profile has a surface roughness of at least an order of magnitude lower than the peak-to-peak amplitude of the oscillatory waveform.

12. The axial piston machine according to claim 1, wherein the cylinder block and the valve body rotate relative to each other about a mutual axis thereof, and the oscillatory waveform lies on a circular path having an axis that coincides with the mutual axis such that the first direction of motion is tangential to the circular path at any point along the circular path.

13. The axial piston machine according to claim 1, wherein the oscillatory waveform is located on both the sealing land of the cylinder block and the portion of the valve body that directly faces the sealing land of the cylinder block.

14. An axial piston machine comprising:
   a cylinder block adapted to be rotated about an axis of the axial piston machine;
   a plurality of cylindrical bores defined in the cylinder block and surrounding the axis;
   a plurality of pistons reciprocably disposed within the cylindrical bores; and
   a valve body having a fluid inlet through which a fluid enters the cylindrical bores and a fluid outlet through which the fluid leaves the cylindrical bores as the pistons reciprocate within the cylindrical bores, the fluid forming a fluid film within an interface between mating surfaces of the cylinder block and the valve body that face each other, the mating surface of the cylinder block having a sealing land and a bearing land, the machine configured such that the mating surfaces slidably move relative to each other in a first direction of motion while maintaining the interface therebetween and maintaining bearing and sealing functions thereat;
   wherein a surface profile comprising an oscillatory waveform located at least on the sealing land of the cylinder block and optionally also on a portion of the valve body that directly faces the sealing land of the cylinder block, the oscillatory waveform defining a circular path that is continuous in the first direction of motion, the oscillatory waveform having a peak-to-peak amplitude of less than one hundred micrometers, the oscillatory waveform producing a hydrodynamic sealing effect sufficient to provide a sealing function around the fluid inlet, the fluid outlet, and the cylindrical bores that limits fluid leakage from the fluid film within the interface as the mating surfaces slidably move relative to each other in the first direction of motion.

15. The axial piston machine according to claim 14, wherein the oscillatory waveform is further located on the bearing land of the cylinder block.

16. A method of reducing power losses of an axial piston machine having a cylinder block adapted to be rotated about an axis of the axial piston machine, a plurality of cylindrical bores defined in the cylinder block and surrounding the axis, a plurality of pistons reciprocably disposed within the cylindrical bores, and a valve body having a fluid inlet through which a fluid enters the cylindrical bores and a fluid outlet through which the fluid leaves the cylindrical bores as the pistons reciprocate within the cylindrical bores, the fluid forming a fluid film within an interface between mating surfaces of the cylinder block and the valve body that face each other, the mating surface of the cylinder block having a sealing land and a bearing land, the machine configured such that the mating surfaces slidably move relative to each other in a first direction of motion and function as bearing and sealing surfaces for the hydrostatic axial sliding bearing while maintaining the inter therebetween and maintaining bearing and sealing functions thereat, the machine comprising at least a first fluid opening in at least one of first and second axial sliding bearing surfaces through which a fluid flows to form the fluid film within the interface between the cylinder block and valve body, the method comprising:

forming a surface profile comprising an oscillatory waveform on at least either on the sealing land of the cylinder block or on a portion of the valve body that directly faces the sealing land of the cylinder block that defines a circular path and is continuous in the first direction of motion, the oscillatory waveform having a peak-to-peak amplitude of less than one hundred micrometers, the oscillatory waveform producing a hydrodynamic sealing effect sufficient to provide a sealing function around the fluid inlet fluid film outlet, and the cylindrical bores that limits fluid leaking from the fluid film within the interface as the first and second axial sliding bearing surfaces slidably move relative to each other in the first direction of motion, the oscillatory waveform if the surface profile is formed to have a being a sinusoidal, a triangular, or a sawtooth waveform.

17. The method according to claim 16, wherein the oscillatory waveform is located at least on a portion of the valve body that directly faces the sealing land of the cylinder block.

18. The method according to claim 16, wherein the oscillatory waveform is located at least on the sealing land of the cylinder block.

19. The method according to claim 16, wherein the oscillatory waveform of the surface profile is formed to have a sinusoidal waveform.

20. The method according to claim 16, further comprising forming the oscillatory waveform on a portion of the valve body that directly faces the bearing land of the cylinder block, on the bearing land of the cylinder block, or both.

21. The method according to claim 16, wherein the oscillatory waveform is formed to have a peak-to-peak amplitude of at least 0.1 micrometer.

22. The method according to claim 16, further comprising forming either the sealing land of the cylinder block or the portion of the valve body that directly faces the sealing land of the cylinder block to have a planar surface profile that lacks an oscillatory waveform.

23. The method according to claim 16, wherein the oscillatory waveform is formed on both the sealing land of the cylinder block and the portion of the valve body that directly faces the sealing land of the cylinder block.

* * * * *